(12) United States Patent
Ansel

(10) Patent No.: US 10,920,647 B2
(45) Date of Patent: Feb. 16, 2021

(54) COMBUSTION ENGINE

(71) Applicant: Liebherr-Components Colmar SAS, Colmar (FR)

(72) Inventor: Morgan Ansel, Colmar (FR)

(73) Assignee: Liebherr-Components Colmar SAS, Colmar (FR)

( * ) Notice: Subject to any disclaimer, the term of this patent is extended or adjusted under 35 U.S.C. 154(b) by 0 days.

(21) Appl. No.: 16/568,183

(22) Filed: Sep. 11, 2019

(65) Prior Publication Data

US 2020/0080461 A1 Mar. 12, 2020

(30) Foreign Application Priority Data

Sep. 11, 2018 (DE) ........................ 10 2018 122 137

(51) Int. Cl.
*F01N 13/08* (2010.01)
*F01N 11/00* (2006.01)
*F01N 3/08* (2006.01)

(52) U.S. Cl.
CPC .......... *F01N 11/002* (2013.01); *F01N 3/0814* (2013.01); *F01N 2290/00* (2013.01); *F01N 2610/146* (2013.01); *F01N 2610/1453* (2013.01); *F01N 2900/1821* (2013.01)

(58) Field of Classification Search
CPC ........ F01N 3/025; F01N 3/0253; F01N 3/029; F01N 3/0293; F01N 2610/02; F01N 2610/11; F01N 2610/1453; F01N 2610/146
See application file for complete search history.

(56) References Cited

FOREIGN PATENT DOCUMENTS

| | | |
|---|---|---|
| CN | 104265426 A | 1/2015 |
| DE | 10300555 A1 | 8/2003 |
| DE | 102010031660 A1 | 1/2012 |
| DE | 102012208034 A1 | 11/2013 |
| EP | 2722505 A1 | 4/2014 |
| FR | 2904363 A1 | 2/2008 |
| WO | 2014149872 A1 | 9/2014 |

OTHER PUBLICATIONS

Machine translation of FR2904363A1, accessed Jul. 5, 2020. (Year: 2020).*
European Patent Office, Extended European Search Report Issued in Application No. 19183248.4, dated Sep. 20, 2019, Germany, 17 pages.

* cited by examiner

*Primary Examiner* — Jonathan R Matthias
(74) *Attorney, Agent, or Firm* — McCoy Russell LLP

(57) ABSTRACT

The present invention shows a combustion engine comprising an exhaust gas aftertreatment system having at least one injector for injecting a reductant into an exhaust gas passage, and an emergency stop that cuts down the energy supply of the components of the engine upon activation, wherein the combustion engine comprises an injector extraction system that extracts the injector from the exhaust gas passage when the emergency stop is activated.

20 Claims, 3 Drawing Sheets

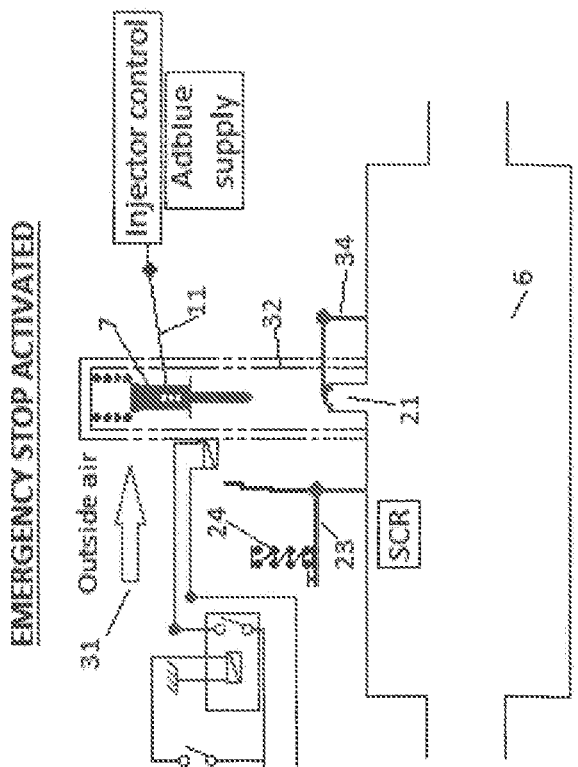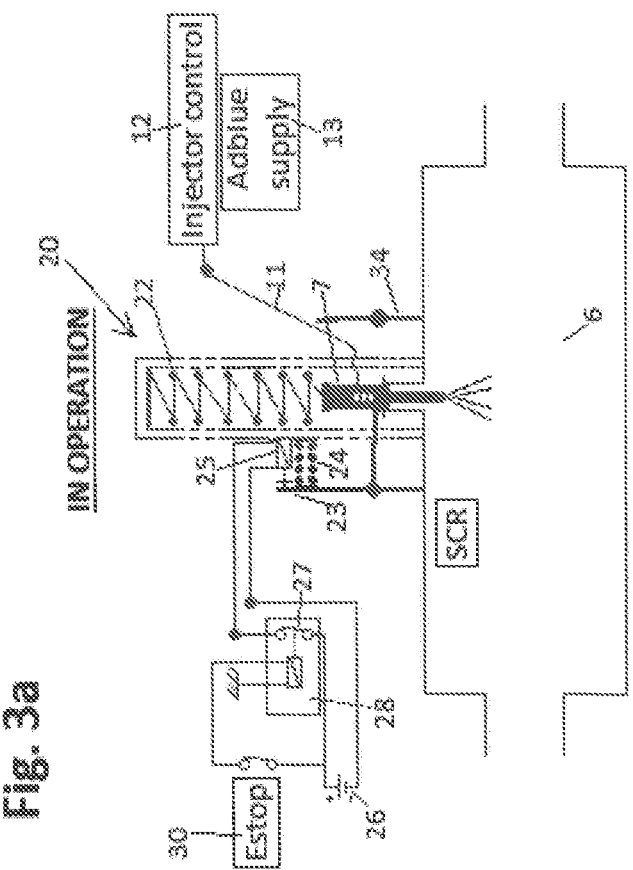

COMBUSTION ENGINE

CROSS REFERENCE TO RELATED APPLICATION

The present application claims priority to German Application No. DE 10 2018 122 137.1 entitled "A COMBUSTION ENGINE", filed on Sep. 11, 2018. The entire contents of the above listed application are hereby incorporated by reference for all purposes.

TECHNICAL FIELD

The present invention relates to a combustion engine comprising an exhaust gas aftertreatment system having at least one injector for injecting a reductant into an exhaust gas passage.

BACKGROUND AND SUMMARY

In an engine having such an exhaust gas aftertreatment system, the injector for injecting reductant, such as urea, into the exhaust has stream is arranged at an exhaust gas passage upstream of the SCR catalyst. The mounting area of the injector therefore has an operation temperature of between 250° C. and 540° C. depending on the load on the engine. In contrast, usual injectors only support temperatures of up to 150° C.

Therefore, the injectors are cooled during operation of the engine. Further, the cooling system is equipped with a post drive to cool the injectors after engine switch-off until the temperature in the mounting area of the injectors falls below the temperature supported by the injectors. For example, the injectors can be cooled by the urea solution that is used as a reductant, by constantly pumping the urea solution through the injector, and by providing the urea pump with a post drive after engine switch-off.

For certain engine applications such as mining and generator applications, the engine has to be equipped with an emergency stop that will cut off every power supply to the engine after emergency stop activation.

Therefore, the emergency stop also cuts off power supply to the cooling system of the injectors and therefore, on an emergency stop, the post drive is not available for cooling the injectors. This will lead to a destruction of the injectors on each emergency stop. An emergency stop can be activated by inexperienced users. Further, even if the emergency stop is not used during normal operation, it will at least have to be tested on commissioning of an engine. The destruction of the injectors is therefore a serious burden.

The object of the present invention is to provide an engine having an exhaust has aftertreatment system and an emergency stop where the activation of the emergency stop will not destroy the injectors.

This object may be addressed by embodiments of the application.

The present invention provides a combustion engine comprising an exhaust gas aftertreatment system having at least one injector for injecting a reductant into an exhaust gas passage, and an emergency stop that cuts down the energy supply of the components of the engine upon activation. According to the invention, the combustion engine comprises an injector extraction system that extracts the injector from the exhaust gas passage when the emergency stop is activated.

By extracting the injectors from the exhaust gas passage, the injectors are removed from their hot mounting area to a cooler area, such that an overheating of the injectors is avoided even if the cooling system of the injectors is de-energized upon activation of the emergency stop.

In an embodiment of the present invention, the injector extraction system comprises at least one extraction spring for extracting the injector from an operation position into an extracted position. Because the extraction system is spring-loaded, it will still operate after the energy supply to the component is switched off by activation of the emergency stop.

The extraction spring preferably is made of metal, in particular of steel. The extraction spring may be configured as a helical spring.

In a first embodiment, the extraction spring is configured to push the injector away from its mounting position at the exhaust gas passage. In a second embodiment, the extraction spring is configured to pull the injector away from its mounting position at the exhaust gas passage.

In an embodiment of the present invention, when the injector is in the operation position, the extraction spring is retained in a pre-loaded state by a retaining system, wherein the retaining system releases the extraction spring when the emergency stop is activated.

In an embodiment of the present invention, during operation of the engine, the retaining system is constantly energized for retaining the extraction spring in the pre-loaded state and releases the extraction spring when the energy supply to the retaining system is cut off by activation of the emergency stop. Thereby, the injector extraction system is automatically activated by releasing the extraction spring when the power supply is cut off by the emergency stop.

In an embodiment of the present invention, the retaining system comprises a constantly energized electromagnet for retaining the extraction spring in the pre-loaded state.

In an embodiment of the present invention, the engine is configured such that the retaining system is kept energized also after a normal switch-off of the engine. This will make sure that the injectors remain in their operation position during a normal switch-off of the engine, and are only extracted by activation of the emergency stop.

For example, the retaining system is connected to an energy storage system that will provide an energy supply to the retaining system even after switch-off. This energy supply will therefore only be cut off by activation of the emergency stop.

In an embodiment of the present invention, the retaining system comprises a spring retainer for at least partly absorbing the spring-load of the extraction spring in a retaining position.

Thereby, the electromagnet does not have to be dimensioned to hold the spring retaining system against the entire force of the extraction spring in the retaining position.

In an embodiment of the present invention, the spring retainer is configured as a lever arm mechanism. Preferably, the holding force necessary to hold the extraction spring in the pre-loaded position is reduced by the lever arm mechanism.

In an embodiment of the present invention, the spring retainer is released from the retaining position by an activation spring, wherein an electromagnet acts against the pre-load of the activation spring for holding the spring retainer in its retaining position. Once the electromagnet is no longer energized, the activation spring will release the spring retainer from its retaining position, such that the spring retainer will in turn release the extraction spring.

In an embodiment of the present invention, the spring retainer is held in the retaining position by a locking element that is held by the electromagnet in its locked position against the pre-load of an activation spring.

Preferably, the spring retainer is configured to absorb the entire load of the extraction spring in the retaining position, such that the electromagnet only has to act against the force of the activation spring.

Preferably, the spring force of the activation spring in its pre-loaded position is smaller than the force of the extraction spring in the pre-loaded position, preferably by a factor of at least 3.

In an embodiment of the present invention, the spring retainer is pivotable around an axis from the retaining position into the release position.

In an embodiment of the present invention, the engine further comprises a sensor for determining that the injector is in its operation position. Thereby, a safe operation of the engine can be assured.

In an embodiment of the present invention, the engine control checks the injector position before starting the engine and/or monitors the injector position during operation. Thereby, an operation of the engine with the injector arranged in the extracted position is avoided.

In an embodiment of the present invention, the engine comprises a closing element for closing the exhaust gas passage on extraction of the injector. In particular, the closing element will close the mounting opening of the exhaust gas passage where the injector is arranged during normal operation.

In an embodiment of the present invention, the closing element is activated by the injector extraction system. For example, the closing element is moved the extraction spring when it is released, or the release of the extraction spring will also release and operation spring of the closing element from a pre-loaded position.

In an embodiment of the present invention, the injector extraction system extracts the injector from its operation position to a position where it is surrounded by ambient air. Thereby, the injector is cooled by ambient air in its extracted position.

In an embodiment of the present invention, the injector extraction system comprises an open guide for the injector. This guide will guide the injector from its operation position into the extracted position, but will allow air to reach the injector by being open to the surroundings. For example, the injector can be guided by brackets.

In an embodiment of the present invention, the engine has a cooling system for cooling the injector during operation of the engine.

For example, the injector can be cooled by pumping reductant through the injector. In particular, a reductant pump can be configured to generate a constant flow of reductant through the injector, a part of which is injected by the injector into the exhaust gas stream, and another part is flowing back to a reductant tank and/or the suction side of the pump, preferably through a cooler.

In an embodiment of the present invention, the cooling system comprises a post drive for cooling the injector after a normal switch-off of the engine, wherein the emergency stop also cuts down the energy supply to the post drive. Thereby, on a normal switch-off of the engine, an extraction of the injector is not necessary, because the injector is cooled by the post drive. Only on activation of the emergency stop, where the energy supply to the post drive also has to be cut, the extraction system is activated for saving the injector.

The post drive can for example be configured to operate the reductant pump for pumping reductant through the injector after switch-off of the engine.

The exhaust gas passage to which the injector is mounted can for example be an exhaust has piping arranged upstream of an SCR catalyst, or an exhaust gas duct of an SCR catalyst.

In an embodiment of the present invention, the mounting area of the exhaust gas passage has an opening at which the injector is arranged in order to inject reductant into the exhaust gas passage. In an embodiment of the present invention, an injection part of the injector reaches through the injector opening such that an injector nozzle of the injector is arranged inside the exhaust gas passage.

The opening of the exhaust gas passage and/or the injector are preferably provided with sealing means for sealingly closing the exhaust gas passage with the injector in the operation position of the injector.

In an embodiment of the present invention, the injector comprises a valve for controlling reductant injection and an actuator for actuating the valve. The actuator is preferably arranged in a part of the injector arranged outside of the exhaust gas passage. The actuator is preferably controlled by an injection controller.

The engine according to the present invention can be equipped with one or more injectors for injecting reductant into the exhaust gas passage. For example, the engine may have more than one injector, for example 4 or 6 injectors.

The injector extraction system of the present invention preferably acts on all the injectors of the engine. For this purpose, a single extraction system may act on several or all injectors. Alternatively or in addition, a first injector may be equipped with a first injector extraction system and a second injector may be equipped with a separate, second injector extraction system.

In an embodiment of the present invention, every injector of the reductant injection system is equipped with its own injector extraction system.

The engine of the present invention can be a Diesel and/or an Otto engine. It may be operated by fuel and/or gas.

In an embodiment of the present invention, the engine is used in a mobile machine, in particular a mobile earth moving machine, such as a mining excavator or mining truck.

In an embodiment of the present invention, the engine is used for driving a generator for the generation of electrical energy.

The present invention further comprises an injector extraction system for a combustion engine as described above. In particular, the injector extraction system comprises an injector extraction mechanism configured to extract the injector from the exhaust gas passage when the emergency stop is activated.

The injector extraction system is preferably configured as already described above in the context of the combustion engine of the present invention.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present invention is now described in more detail with respect to preferred embodiments and drawings.

The drawings show:

FIGS. 3a and 3b: a second embodiment of an injector retraction system according to the present invention in a state where the injector is in its operation position (FIG. 3a) and in a state where the injector is in its extracted position (FIG. 3b).

DETAILED DESCRIPTION

Figure 1:
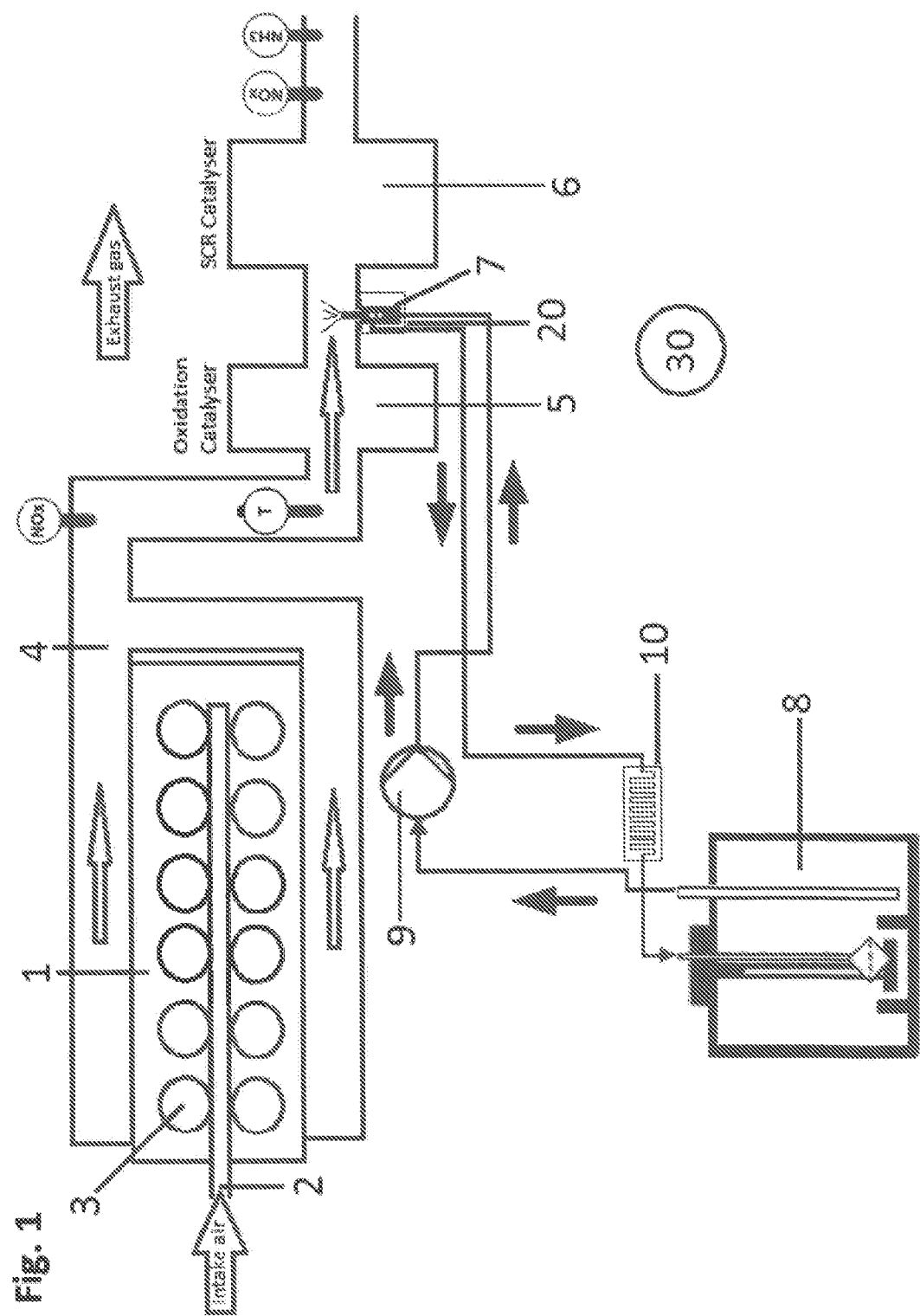
FIG. 1: a schematic drawing of an embodiment of a combustion engine according to the present invention.

FIG. 1 shows the general configuration according to an embodiment of the present invention. The engine 1 comprises an air inlet manifold to supply air to at least one combustion chamber 3, and an exhaust gas manifold for transporting away exhaust gases from the at least one combustion chamber. In the embodiment, the engine is a reciprocating piston engine comprising cylinders as combustion chambers.

The exhaust gas manifold 4 forms an upstream part of an exhaust gas passage of the engine. In the exhaust gas passage, an exhaust gas after treatment system having at least one injector 7 for injecting a reductant into the exhaust gas passage and a catalyst 6, in particular an SCR catalyst, are provided. The reductant used in the engine may for example be a urea solution, such as AdBlue.

In the embodiment, the injector 7 is provided in an exhaust gas duct arranged upstream of the catalyst 6. In alternative embodiments, the injector could also be arranged directly on the catalyst 6.

The exhaust gas after treatment system may be provided with further catalysts and/or further exhaust gas after treatment parts. FIG. 1 shows, as an example, an oxidation catalyst 5 arranged upstream of the injector 7.

In the embodiment shown schematically in FIG. 1, only one injector 7 is shown. However, the present invention is not limited to this situation. In fact, in most embodiments, several injectors will be provided in order to provide sufficient reductant injection into the exhaust gas. For example, four injectors or six injectors could be mounted on the exhaust gas passage.

In a usual configuration, the mounting area of the injector will have a temperature between 250° C. and 540° C., depending on engine load. The maximum temperature supported by the injectors is however lower than the temperature of the mounting area, and may be for example lower than 250° C., for example at around 150° C.

The injector 7 therefore has a cooling system for cooling the injector during operation of the engine. In the embodiment shown in FIG. 1, the injector 7 is cooled with its own reductant. For this purpose, a reductant pump 9 constantly maintains a flow of reductant through the injector 7, only part of which is injected into the exhaust gas stream, and another part of which flows back via a cooler 10 to the reductant tank 8.

In an alternative embodiment, injector 7 may be provided with a cooling system that works separately from the reductant supply to the injector.

The cooling system of the injectors is configured such that it stays activated as long as the engine is running. Further, when the engine is switched off, a post drive of the cooling system is activated to maintain the cooling function of the cooling system until the mounting area of the injectors has sufficiently cooled down to avoid a thermal destruction of the injectors.

The engine is further provided with an emergency stop-push button 30, activation of which will cut off every power supply to components of the engine, and therefore also to the cooling system of the injectors 7. Therefore, after activation of the emergency stop, the cooling system including the post drive will immediately stop operation, and is no longer available to cool the injector, even though the mounting area will have a temperature that is above the maximum temperature supported by the injector.

According to the present invention, the engine is therefore provided with an injector extraction system 20 schematically shown in FIG. 1, which will extract the injector 7 from the exhaust gas passage when the emergency stop 30 is activated.

In particular, the injector extraction system is configured such that it will it will retain the injector in its operation position as long as the injector extraction system is connected to a power supply, and extract the injector from the exhaust gas passage when activation of the emergency stop 30 cuts off the power supply to the injector extraction system.

FIGS. 2 and 3 show two exemplary embodiments of such an injector extraction system 20.

In both embodiments, the injector 7 is arranged at an injector opening 21 of the exhaust gas passage. In the embodiment shown, the injector is arranged directly at the SCR. However, the injectors could also be arranged at a different part of the exhaust gas passage, for example at an exhaust gas duct upstream of the SCR catalyst 6.

Figure 2B:
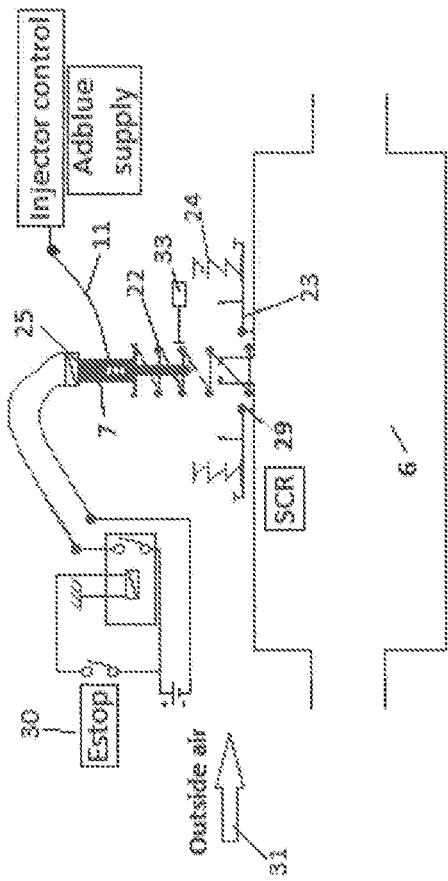
FIGS. 2a and 2b: a first embodiment of an injector retraction system according to the present invention in a state where the injector is in its operation position (FIG. 2a) and in a state where the injector is in its extracted position (FIG. 2b)
Figure 2A:
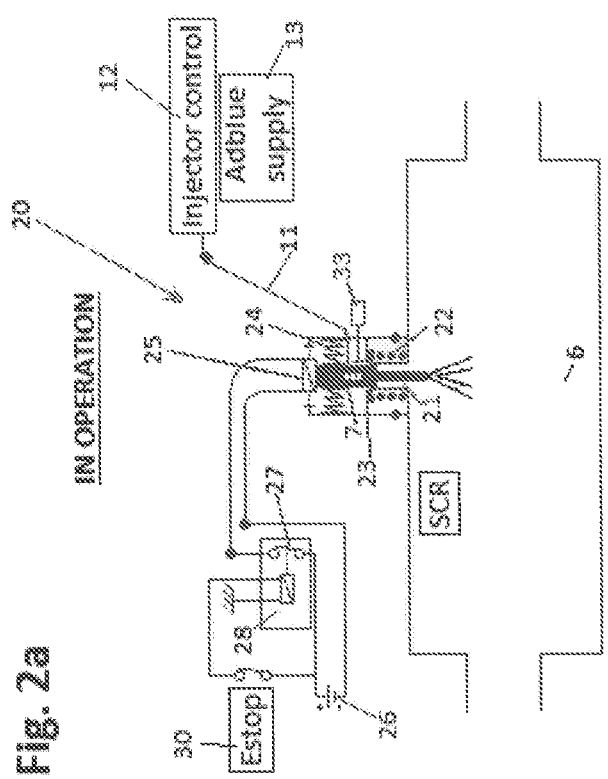

In the operation position shown in FIGS. 2a and 3a, the injector 7 is arranged at the injector opening 21, and an injection part of the injector reaches through the opening into the exhaust gas passage. Thereby, reductant can be injected directly into the exhaust gas stream. The injector is further provided with a valve that is operated by an actuator of the injector to control the injection of reductant. The actuator part of the injector is arranged outside of the exhaust gas duct.

FIGS. 2 and 3 further show an injector control 12, as well as a reductant supply 13, both connected to the injector 7 by a flexible connection line 11. The connection line therefore comprises an electrical control line and a reductant supply line. The injector control 12 controls the actuator of the injector such that a measured quantity of reductant, supplied by the supply line, is injected into the exhaust gases stream. The connection line may further comprise a reductant backflow line for the part of the reductant used for cooling purposes and flowing back from the injector. The control 12 may include a processor and memory storing instructions for at least control of the actuator if the injector. The control 12 may also include instructions for operation of the engine and injector.

In both embodiments, an extraction spring 22 is used for extracting the injector from its operation position shown in FIGS. 2a and 3a into the extracted position shown in FIGS. 2b and 3b.

In the embodiment shown in FIG. 2, the extraction spring 22 is arranged such that it will push the injector into its extracted position. In the embodiment shown in FIG. 3, the extraction spring 22 is arranged such that it will pull the extractor into its extracted position.

The injector extraction system will keep the injectors away from the heat source after an emergency stop activation. The injector will be moved by the extraction spring, and either be pulled or pushed depending on the concept.

In the embodiment shown, as long as the emergency stop is not activated, the injectors are maintained in their operating position by an electromagnet 25. The power supply to the electromagnet will only be cut off by the emergency stop 30, i.e. not after a normal ignition switch off. Therefore, the injectors will only be extracted from the exhaust gas passage on an emergency stop, and not during a normal switch off of the engine, because in a normal switch off the engine, the post drive of the cooling system is available for cooling of the injectors.

As schematically shown in FIG. 2, an injector presence sensor 33 is provided to ensure that the injectors are in their operation position before starting the engine. Preferably, the injector presence sensor 33 is connected to an engine controller and used by the engine controller to monitor the presence of the injectors in their operation position during operation of the engine.

Further, as shown in FIG. 3, a closing element 34 could be added to close the injector opening 21 after the injector extraction. In particular, a plate of the closing element 34 may be moved by the injector extraction system to close the injector opening 21 of the exhaust gas passage from the outside.

In both embodiments, the extraction spring 22 is retained in a pre-loaded state by a retaining system, which releases the extraction spring when the emergency stop is activated. For this purpose, a spring retainer 23 is provided that will absorb at least a part of the spring force of the pre-loaded spring in the retaining position. The spring retainer 23 is retained in the retaining position by the electromagnet 25. Once the power supply to the electromagnet 25 is cut off, the spring retainer will be moved out of the retaining position and release the extraction spring 22, which will extract the injector 7 from the exhaust gas passage.

In the embodiments shown in FIGS. 2 and 3, the spring retainer 23 is a lever arm system that is pivotably mounted on an axis 29. In the retaining position, a first lever arm retains the extraction spring 22 in its pre-loaded state. A second lever arm is retained by the electromagnet 25. The lever arm that is retained by the electromagnet is longer than the lever arm for absorbing the spring force of the extraction spring, such that the force that is necessary to retain the spring retainer in its retaining position is smaller than the spring force of the extraction spring.

In the embodiment, an activation spring 24 is provided that will move the spring retainer from the retaining position into a release position when the energy supply to the electromagnet 25 is cut off.

Alternatively or in addition to the lever arm construction shown in FIGS. 2 and 3, the spring retainer may be retained in the retaining position by a locking element, wherein the locking element is held by the electromagnet 25 in its locking position against the spring force of an activation spring. Thereby, the holding force necessary for the electromagnet 25 to hold the spring extraction system is independent from the spring force of the extraction spring.

In the embodiment shown in FIGS. 2a and 2b, the extraction spring 22 is arranged between the exhaust gas passage and the injector, and will push the injector away from the exhaust gas passage. The injector may be connected to one end of the spring, and thereby be guided by the spring away from the exhaust gas passage. Alternatively or in addition, a guide for the injector may be provided for guiding the injector along the extraction path.

In the embodiment shown in FIGS. 3a and 3b, the extraction spring 22 is arranged on a bracket 32 mounted above the injector 7, and will pull the injector away from the exhaust gas passage. The bracket 32 may also have a guiding function for the injector. The bracket 32 is preferably mounted on the exhaust gas passage at a position next to the mounting area of the injector.

If a guide is provided for the injector, it is a preferably formed as an open structure to allow air circulation around the injector. For example, in FIGS. 3a and 3b, the brackets 32 could be formed as open brackets.

If more than one injector is provided, each injector may have its own extraction system. Alternatively, two or more injectors could be provided with a common extraction system.

Independently from the specific construction shown in FIGS. 2 and 3, the injector is preferably extracted from the exhaust gas passage into ambient air. Thereby, an ambient air stream 31 will cool the injector after being extracted from the exhaust gas passage.

In order to ensure that the extraction system will only be activated when the emergency stop is activated, it is connected to an energy storage system of the engine, for example to the batteries of the engine, and therefore will be permanently energized.

In the embodiments shown in FIGS. 2 and 3, the electromagnet 25 of the injector extraction system is connected to the energy storage system 26. This connection is cut off by the emergency stop 30. In the embodiment, this is ensured by connecting the injector extraction system to the energy storage system 26 via an electromagnetic switch 27, which is only closed if the actuator 28 of the switch is energized. The emergency stop will cut the energy supply to the switch 27, such that the switch will open and thereby cut the energy supply to the injector extraction system.

The inventive injector extraction system will save the injectors from thermal damage on activation of an emergency stop-push-button, which is required in a number of applications such as energy generation and mining applications.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein As used herein, the term "approximately" is construed to mean plus or minus five percent of the value or range unless otherwise specified The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A combustion engine, comprising:
   an exhaust gas aftertreatment system having at least one injector for injecting a reductant into an exhaust gas passage, and
   an emergency stop that cuts down the energy supply of the components of the engine upon activation,
   wherein the combustion engine comprises an injector extraction system that extracts the injector from the exhaust gas passage when the emergency stop is activated.

2. The combustion engine of claim 1, wherein the injector extraction system comprises at least one extraction spring configured as an actuator for extracting the injector from an operation position into an extracted position.

3. The combustion engine of claim 2, wherein when the injector is in the operation position, the extraction spring is retained in a pre-loaded state by a retaining system, wherein the retaining system is configured to release the extraction spring when the emergency stop is activated.

4. The combustion engine of claim 3, wherein the engine is configured such that during operation of the engine, the retaining system is constantly energized and retains the extraction spring in the pre-loaded state when energized, and
   wherein the retaining system releases the extraction spring when the energy supply to the retaining system is cut off by activation of the emergency stop.

5. The combustion engine of claim 4, wherein the engine is configured such that the retaining system is kept energized also after a normal switch-off of the engine.

6. The combustion engine of claim 5, wherein the retaining system is connected to an energy storage system.

7. The combustion engine of claim 4, wherein the retaining system comprises a constantly energized electromagnet for retaining the extraction spring in the pre-loaded state.

8. The combustion engine of claim 3, wherein the retaining system comprises a spring retainer for at least partly absorbing the spring-load of the extraction spring in a retaining position, wherein the spring retainer is released from the retaining position by an activation spring, wherein an electromagnet acts against the pre-load of the activation spring for holding the spring retainer in its retaining position.

9. The combustion engine of claim 8, wherein the spring retainer is configured as a lever arm mechanism.

10. The combustion engine of claim 1, comprising a closing element for closing the exhaust gas passage on extraction of the injector.

11. The combustion engine of claim 10, wherein the closing element is activated by the injector extraction system.

12. The combustion engine of claim 1, wherein the injector extraction system extracts the injector from its operation position to a position where it is surrounded by ambient air that was not previously contained in the exhaust gas system.

13. The combustion engine of claim 12, wherein the injector extraction system comprises an open guide for the injector.

14. The combustion engine of claim 1, wherein the injector extraction system is configured to extract the at least one injector from the exhaust gas passage when an energy supply to the injector extraction system is cut off by an activation of the emergency stop.

15. The combustion engine of claim 1, wherein the injector extraction system is configured to at least temporarily open the exhaust gas passage on extraction of the injector.

16. A combustion engine, comprising:
   an exhaust gas aftertreatment system having at least one injector configured for injecting a reductant into an exhaust gas passage,
   an emergency stop that cuts down the energy supply of the components of the engine upon activation, and
   a sensor for determining that the injector is in its operation position,
   wherein the combustion engine comprises an injector extraction system that extracts the injector from the exhaust gas passage when the emergency stop is activated.

17. The combustion engine of claim 16, wherein an engine control checks the injector position before starting the engine and/or monitors the injector position during operation.

18. An injector extraction system within a combustion engine;
   the injector extraction system is configured to extract at least one injector from an exhaust gas passage when an energy supply to the injector extraction system is cut off by an activation of an emergency stop.

19. The injector extraction system of claim 18, comprising a closing element for closing the exhaust gas passage on extraction of the injector.

20. The injector extraction system of claim 18, comprising a sensor for determining that the injector is in its operation position.

* * * * *